United States Patent [19]
Cain et al.

[11] Patent Number: 5,133,049
[45] Date of Patent: Jul. 21, 1992

[54] ACCELERATED DECOMPOSITION OF SMALL POLYGONS INTO TRAPEZOIDS

[75] Inventors: Bradley W. Cain; Randall D. Briggs, both of Fort Collins, Colo.

[73] Assignee: Hewlett-Packard Company, Palo Alto, Calif.

[21] Appl. No.: 493,185

[22] Filed: Mar. 14, 1990

[51] Int. Cl.$^5$ ............................................. G06F 15/62
[52] U.S. Cl. ................................. 395/133; 395/134; 395/141
[58] Field of Search ............... 364/518, 521; 395/133, 395/134, 141; 340/723

[56] References Cited

U.S. PATENT DOCUMENTS

| | | | |
|---|---|---|---|
| 4,725,831 | 2/1988 | Coleman | 340/723 X |
| 4,791,582 | 12/1988 | Ueda et al. | 364/521 X |
| 5,020,002 | 5/1991 | Malachowsky | 364/518 |

OTHER PUBLICATIONS

Fuchs et al., "Pixel-Planes 5: A Heterogeneous Multi-processor Graphics System Using Processor-Enhanced Memories," Computer Graphics, vol. 23, No. 3, Jul. 1989, pp. 79-88.
D. T. Lee, "Shading of Regions on Vector Display Devises," Computer Graphics, vol. 15, No. 3, Aug. 1981, pp. 37-44.
Rhoden et al., "Hardware Acceleration for Window Systems," Computer Graphics, vol. 23, No. 3, Jul. 1989, pp. 61-67.

Primary Examiner—Gary V. Harkcom
Assistant Examiner—Mark K. Zimmerman
Attorney, Agent, or Firm—Guy J. Kelley

[57] ABSTRACT

A method and device for improving the processing performance of a transform engine by off-loading the processing of those input polygons which have no more than a predetermined number of edges and decomposing such polygons into trapezoids which can be rendered by a scan conversion system. This is accomplished in accordance with the invention by reading edge data of each input polygon into a RAM and determining the relative positions of the Y coordinates of end points of each edge so that the beginning and end of each respective edge of the polygon in the Y direction may be determined. The polygon is then broken into trapezoids by reading in the respective beginning points of respective edges of the polygon and proceeding until the end point of one of the edges is reached. At the end of one edge, another edge of the polygon is read in, and the process continues until all trapezoids in the polygon have been drawn. Since trapezoids may be much more efficiently handled by the scan conversion system, a significant performance enhancement in the polygon processing is made possible in accordance with the invention.

14 Claims, 4 Drawing Sheets

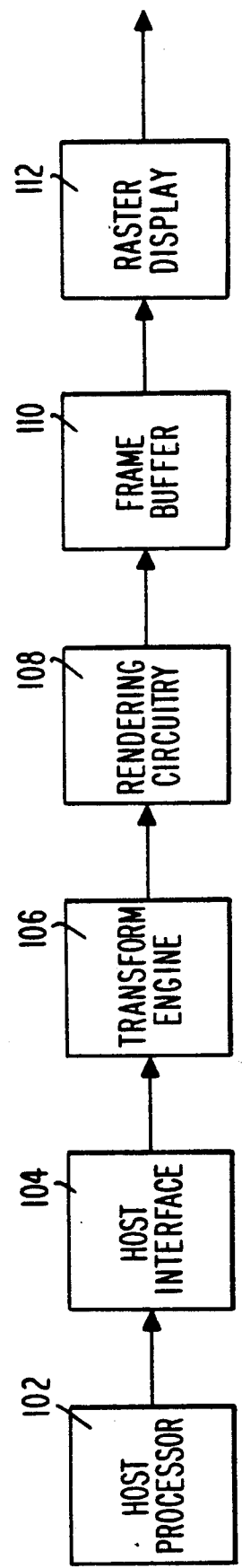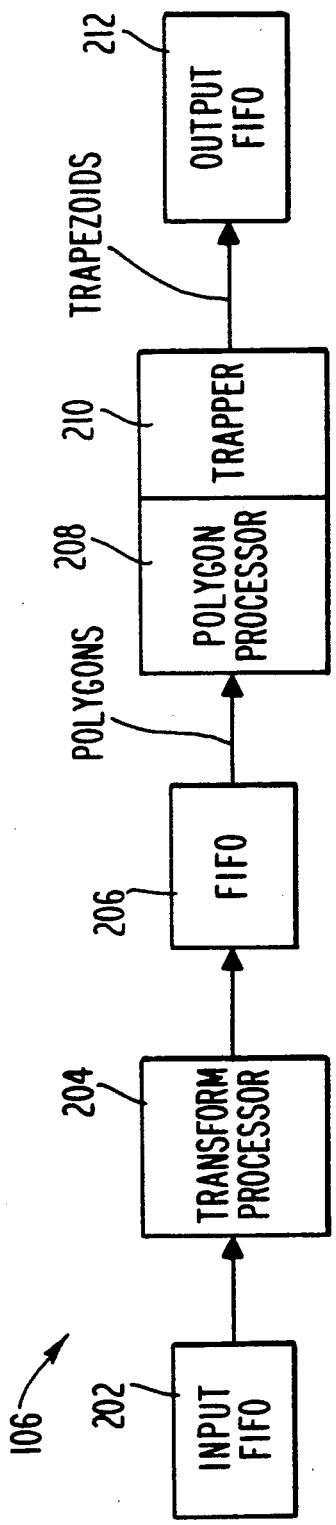

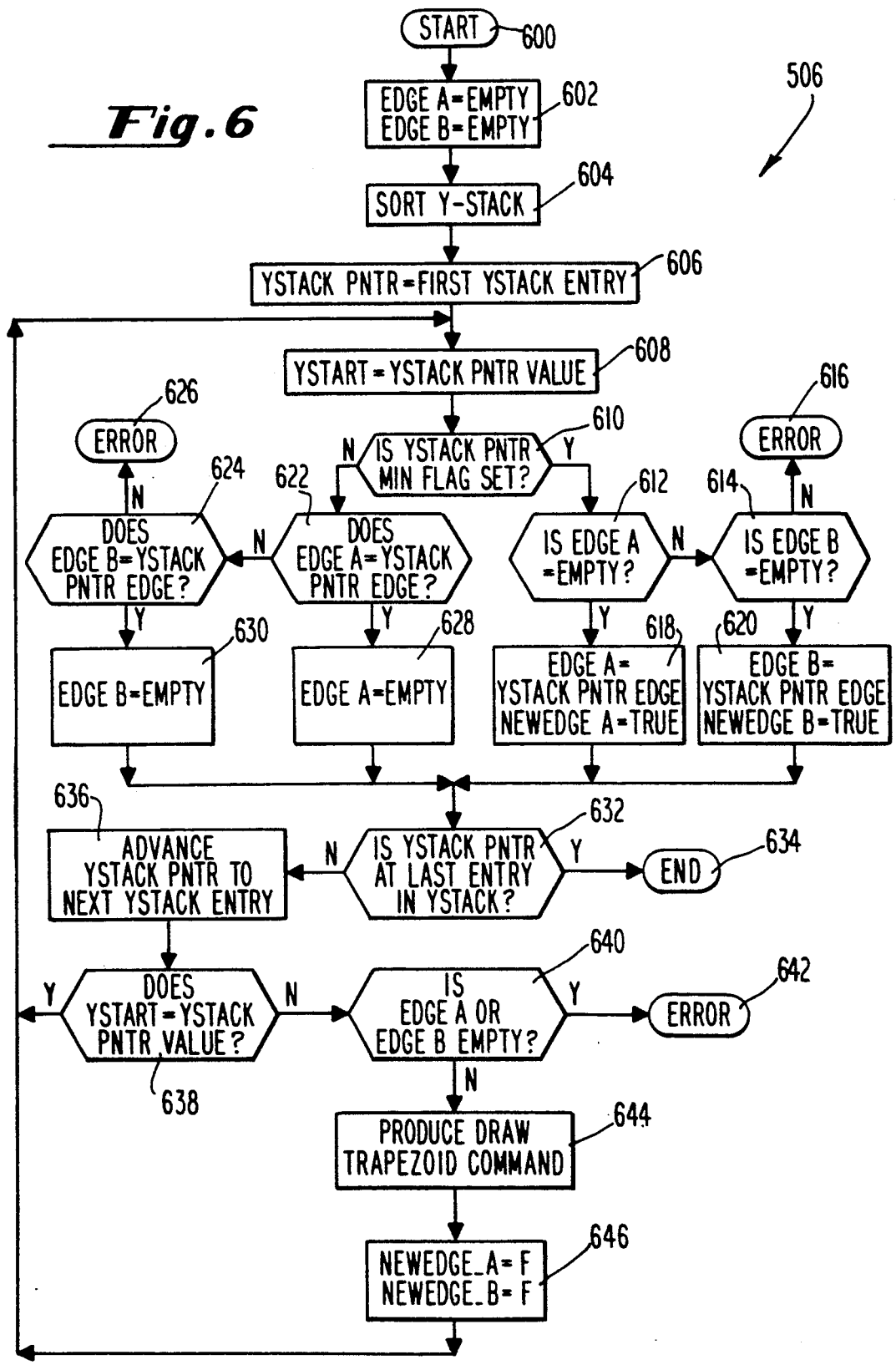

ACCELERATED DECOMPOSITION OF SMALL POLYGONS INTO TRAPEZOIDS

BACKGROUND OF THE INVENTION

1. Field of the Invention

The present invention relates to a graphics transformation engine, and more particularly, to a process and apparatus for decomposing small input polygons representing an image into trapezoids which can be rendered more efficiently by a raster scan conversion system.

2. Description of the Prior Art

Prior art raster graphics systems generally contain two distinct parts: a graphics transformation engine that transforms and lights the geometric description of a scene in accordance with the user's viewpoint and a renderer that paints the transformed scene onto a display screen. As is well known, the geometric description of the scene may comprise a combination of a plurality of polygons having an arbitrary number of sides. In other words, the 3-dimensional image to be displayed has been described as a surface composed of polygons of differing shadings. As used herein such a "polygon" refers to an ordered set of vertices V[1]... V[N] where N is the vertex count for the polygon. These vertices specify the N edges of the polygon, which are line segments E[1]... E[N] with end points made up of respective vertices V[1]... V[N]. For example, line segment E[1] may have end points V[1] and V[2], while line segment E[2] has end points V[2] and V[3]. Such polygons may be identified by the graphics transformation engine as a sequence of graphics primitives including information such as the coordinates (X,Y,Z) of the vertices of each polygon as well as the shading information for each of the vertices and instructions which are processed in the graphics transformation engine for all pixel-level rendering computations.

Such geometric representations of a scene greatly facilitate the processing by a graphics transformation engine which is necessary for rendering the pixel image data to the display screen. The graphics transformation engines typically perform many tasks on such data including graphics context management, matrix transformation calculations, spline tessellation and lighting model computations. The transformation engines may also control vector and polygon rendering hardware. However, such computations are generally quite complex and time-consuming and require much processing power, and the resulting processing difficulties have often been the primary limitation upon the speed by which images may be rendered in conventional raster graphics systems.

The most common proposal for solving the above-mentioned problem has been to increase the processing power of the graphics transformation engines. For example, a plurality of transformation engines have been provided in parallel so that the processing of each of the respective polygons may be performed in parallel. However, such systems are quite complicated and expensive and still do not process the polygons efficiently. As a result, the processing efficiency for graphics primitives information has been heretofore severely limited. Thus, it is desirable that means be provided for improving the processing efficiency of graphics transformation engines so that even complex 3-dimensional images containing numerous simple polygons may be rendered at interactive rates.

Accordingly, there is a long-felt need in the art for a process and apparatus for enhancing the performance of conventional graphics transformation engines so that input polygons may be processed at truly interactive rates. There is also a long-felt need in the art for a system which can accelerate the rendering of simple polygons such as triangles and quadrilaterals so that faster and easier scan conversion down the graphics pipeline may be achieved. The present invention has been designed to meet these needs.

SUMMARY OF THE INVENTION

The above-mentioned long-felt needs in the art have been met in accordance with the present invention by providing means for handling much of the polygon processing work of a graphics transformation engine so as to improve processing efficiency. In particular, a process and apparatus is provided for decomposing simple input polygons such as triangles and quadrilaterals into trapezoids which can be easily rendered by the scan conversion system at an increased speed. Since most polygon databases primarily contain triangles and quadrilaterals, a trapezoidilization circuit of the invention will normally decompose most polygons in the graphics system, thereby enabling the overall processing performance to be increased as much as 50%.

In accordance with the invention, a device is provided for processing a plurality of polygons representative of an image to be displayed on a display device, each polygon having no more than a predetermined number of edges which are rendered by the display device during reproduction of the image. Such a device in accordance with the invention preferably comprises means for providing edge data for each input polygon of the image to be displayed and trapezoidilization means for breaking each input polygon having no more than the predetermined number of edges into at least one trapezoid, each trapezoid being a closed quadrilateral having three or four edges of which exactly two of the edges are not parallel to one coordinate direction of the display device. The edge data for each trapezoid of each input polygon may then be output to the display device for easy rendering. Preferably, the providing means comprises means for processing those input polygons having more than the predetermined number of edges so that all input polygons may be processed.

In a preferred embodiment of the invention, the trapezoidilization means comprises a RAM for storing the edge data for each input polygon, processing means for determining the end points of each edge of each input polygon and means for ordering the end points in accordance with the coordinate values of each end point in a direction perpendicular to the coordinate direction. The trapezoidilization means of such an embodiment may also comprise a stack register for storing the ordered end points of the edges of each input polygon and for storing a flag representing which end of an edge each end point represents in the direction perpendicular to the coordinate direction.

In another preferred embodiment of the invention, the processing means may determine the coordinate value in the direction perpendicular to the coordinate direction of each end point of each respective edge of each input polygon and store these values for each edge in the stack register.

The apparatus of the invention thus forms each trapezoid of an input polygon so that is defined in the direction perpendicular to the coordinate direction from a starting end point of an edge of the input polygon, where a flag of the starting end point indicates that the starting end point has a minimum coordinate value in the direction perpendicular to the coordinate direction for the edge, to a first encountered end point of an edge of the input polygon in the direction perpendicular to the coordinate direction, where a flag of the first encountered end point indicates that the first encountered end point has a maximum coordinate value for an edge of the input polygon in the direction perpendicular to the coordinate direction. The output trapezoid thus has edges which are defined in a direction parallel to the coordinate direction from a first edge to a second edge of the input polygon, whereby edges of each trapezoid which are parallel to the coordinate direction respectively pass through the starting end point and the first encountered end point. Preferably, the starting end point and the first encountered end point are taken from the ordered stack register as respective entries having different coordinate values in the direction perpendicular to the coordinate direction.

The invention also comprises a method of processing a plurality of polygons representative of an image to be displayed on a display device, each polygon having no more than a predetermined number of edges with associated edge data. Such a method in accordance with the invention preferably comprises the steps of:

providing the edge data for each input polygon of the image to be displayed;

breaking each input polygon having no more than the predetermined number of edges into at least one trapezoid, each trapezoid being a closed quadrilateral having three or four edges of which no more than two edges are not parallel to a coordinate direction of the display device; and outputting the edge data for each trapezoid of each input polygon to the display device.

In accordance with a preferred embodiment, the polygon breaking step comprises the steps of storing the edge data for each input polygon, determining the end points of each edge of each input polygon and ordering the end points in accordance with the coordinate values of each end point in a direction perpendicular to the coordinate direction. The polygon breaking step may also comprise the steps of storing the ordered end points of the edges of each input polygon and storing a flag representing which end of an edge each end point represents in the direction perpendicular to the coordinate direction. In addition, the polygon breaking step may include the steps of determining the coordinate value in the direction perpendicular to the coordinate direction of each end point of each respective edge of each input polygon and storing these values for each edge.

A preferred method of the invention also comprises the step of rendering each polygon, wherein each trapezoid of a rendered polygon is defined in the direction perpendicular to the coordinate direction from a starting end point of an edge of the input polygon, where a flag of the starting end point indicates that the starting end point has a minimum coordinate value in the direction perpendicular to the coordinate direction for the edge, to a first encountered end point of an edge of the input polygon in the direction perpendicular to the coordinate direction, where a flag of the first encountered end point indicates that the first encountered end point has a maximum coordinate value for an edge of the input polygon in the direction perpendicular to the coordinate direction, and is defined in a direction parallel to the coordinate direction from a first edge to a second edge of the input polygon, whereby edges of each trapezoid which are parallel to the coordinate direction respectively pass through the starting end point and the first encountered end point. Such rendering may be accomplished using a draw trapezoid command with data specifying the starting end point, the difference in the direction perpendicular to the coordinate direction between coordinate values of the starting end point and the first encountered end point, and edge data identifying edges of the input polygon which are not parallel to the coordinate direction.

In accordance with another preferred method of the invention, a method is provided for processing a plurality of polygons representative of an image to be displayed on a display device, each polygon having no more than a predetermined number of edges with associated edge data, comprising the steps of:

reading in respective vertices of each input polygon having no more than the predetermined number of edges;

determining the maximum and minimum coordinate values in a coordinate direction perpendicular to a scan direction of each edge of each input polygon;

breaking each input polygon into at least one trapezoid, each trapezoid being a closed quadrilateral having three or four edges of which no more than two edges are not parallel to the scan direction; and outputting the edge data for each trapezoid of each input polygon to the display device.

Preferably, the polygon breaking step of such a method includes the steps of:

sorting the vertices to sequence the coordinate values of the vertices in the coordinate direction perpendicular to the scan direction in increasing order;

for each sorted vertex, determining whether it has a maximum or minimum coordinate value in the coordinate direction perpendicular to the scan direction for its associated edge of the input polygon;

reading in the edge data for the respective edges of the sorted vertices of the input polygon until a vertex having a maximum coordinate value is encountered;

producing a trapezoid defined in the coordinate direction perpendicular to the scan direction from a vertex having a minimum coordinate value for an input edge to a vertex having the maximum coordinate value for its associated edge; and reading in a new edge of the input polygon to replace the edge with the vertex having the maximum coordinate value.

A new edge of the input polygon is preferably read in until all edges of the input polygon have been read in and a corresponding trapezoid produced.

The process and apparatus in accordance with the invention thus enables significant processing enhancements to be achieved since the trapezoids passed to the scan conversion system may be rendered much more easily than the typical multi-sided polygons often received by the scan conversion systems in prior art graphics display systems. Further benefits will be apparent from the following detailed description of the invention.

BRIEF DESCRIPTION OF THE DRAWINGS

The objects and advantages of the invention will become more apparent and more readily appreciated from the following detailed description of the presently preferred exemplary embodiment of the invention taken in conjunction with the accompanying drawings of which:

FIG. 1 schematically represents a conceptual block diagram of a host system and a graphics processing subsystem including a transform engine embodying the present invention.

FIG. 2 schematically illustrates a transform engine including a trapezoidilization circuit in accordance with the invention.

FIG. 6 illustrates an algorithm for dividing the input polygon into trapezoids in accordance with the invention.

DETAILED DESCRIPTION OF THE PREFERRED EMBODIMENT

Figure 3:
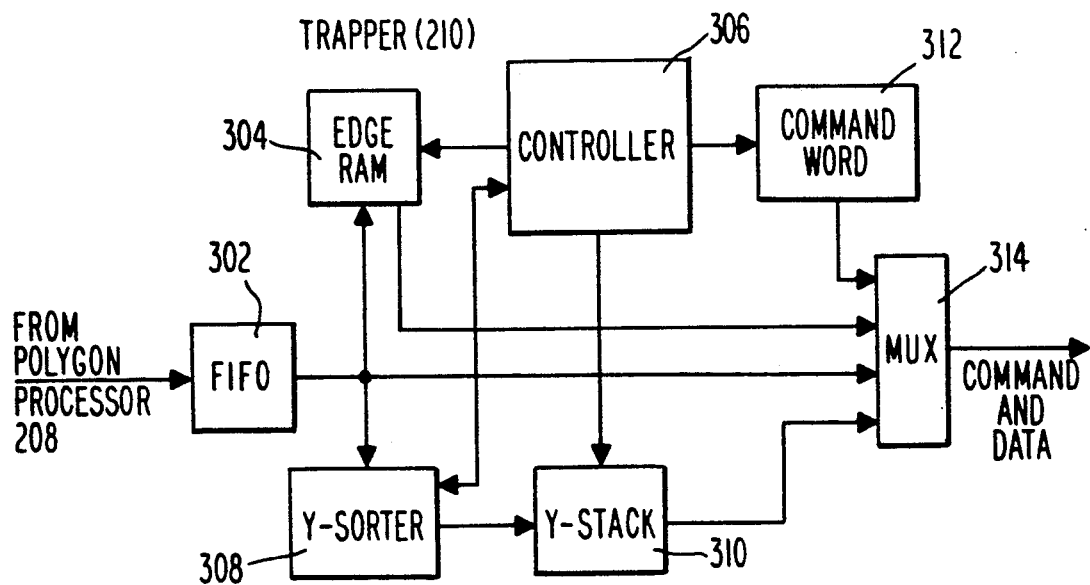
FIG. 3 schematically illustrates an embodiment of a trapezoidilization circuit in accordance with the invention.

The inventors of the subject matter disclosed and claimed herein have satisfied the above-mentioned long-felt needs in the art by developing a trapezoidilization circuit which decomposes small input polygons into trapezoids which can then be easily rendered by a scan conversion system. As will be clear from the following description, the trapezoidilization circuit of the invention (hereinafter called "Trapper") functions as a subsystem of the graphics transformation engine which processes the input polygons in order to increase overall system performance. In particular, by breaking small input polygons into trapezoids, the subsystem (hereinafter called the "polygon processor") relieves the graphics transformation engine from having to decompose simple polygons. Moreover, since most polygon databases contain primarily simple polygons such as triangles and quadrilaterals, Trapper will generally decompose most polygons processed by the graphics transformation engine, thereby providing a significant performance enhancement at a reduced cost.

A process and apparatus with these and other beneficial features in accordance with a presently preferred exemplary embodiment of the invention will now be described with reference to FIGS. 1-6. It will be appreciated by those of ordinary skill in the art that the description given herein is for exemplary purposes only and is not intended in any way to limit the scope of the invention. All questions regarding the scope of the invention may be resolved by referring to the appended claims.

FIG. 1 shows a host processing system 102 interfaced with a graphics subsystem via a host interface 104. As shown, the graphics subsystem generally comprises a graphics transform engine 106 with its output provided to graphics rendering circuitry 108. The output of graphics rendering circuitry 108 is applied to frame buffer 110, the output of which is received by a raster display device 112 and output to a CRT screen, for example. As will be described in detail below, the present invention is particularly directed to the transform engine 106 and the technique by which certain polygons representing an input image may be subdivided into trapezoids for more efficient image rendering.

The transform engine 106 in accordance with the invention is shown in more detail in FIG. 2. As shown, the transform engine 106 typically receives input polygons representing an image to be rendered via an input first-in-first-out buffer (input FIFO) 202. The received polygons are then sequentially read from the input FIFO 202 by transform processor 204, which may be a general purpose processor programmed for use as a transform processor. The output of the transform processor 204 is then input into another FIFO 206 before being input into polygon processor 208, which also may be a specially programmed general purpose processor as would be apparent to those skilled in the art. Polygon processor 208 is typically responsible for edge slope calculations and sub-pixel adjustments and for providing instructions to downstream hardware. However, in accordance with the invention, the processing performed by the polygon processor 208 is significantly simplified by the addition of a trapezoidilization circuit (Trapper) 210 which decomposes simple input polygons having no more than a predetermined number of edges into trapezoids with one or two edges parallel to a coordinate (or scan) direction of the display screen. As will be described in more detail below, Trapper 210 subdivides simple polygons having no more than four edges into trapezoids, although one skilled in the art will appreciate that the techniques of the invention may be used with more complex polygons with the attendant loss in processing simplicity and speed. Polygons having more than the predetermined number of edges will still be processed by transform processor 204 and/or polygon processor 208. The resulting trapezoids are then passed to downstream hardware for rendering via output FIFO 212 for rendering.

Trapper 210 may be designed as a CMOS gate array which is part of the polygon processor 208 hardware so as to reduce the cost of the polygon processor 208 hardware and so that extra hardware is not required to tie together Trapper 210 and the polygon processor 208. Trapper 210 produces trapezoids from edge data it receives through a process referred to herein as "trapezoidilization". As used herein, "trapezoidilization" means the process of subdividing an input polygon into one or more trapezoidal regions having one or two edges parallel to a coordinate axis of the display device (only one edge is parallel to the coordinate axis when either the top or bottom edge of the trapezoid is degenerate, i.e., is a single point, as for a triangle). In addition, for the embodiment described herein, Trapper 210 only performs trapezoidilization for those input polygons having 2, 3 or 4 vertices and those which are convex in Y. Y convexity is a property of a polygon whereby the polygon never has more than two edges in any scan line, and does not necessarily preclude processing of a trapezoid having non-horizontal edges which cross one another. Any input polygons not meeting these requirements will not be processed by Trapper 210 and will instead be processed entirely by the polygon processor 208 and/or the transform processor 204, with the results being simply passed through Trapper 210 straight to the output. The importance of these requirements will be more clear from the following detailed description of Trapper 210.

FIG. 3 schematically illustrates a block diagram of a presently preferred embodiment of Trapper 210. As shown in FIG. 3, the output of polygon processor 208 is input into a FIFO 302 which allows edge data to be written into Trapper 210 even while it is busy creating a trapezoid or its output port is just backed up. For this purpose, FIFO 302 need not be very deep and is typically 32 words deep, which is just enough to cover the extreme cases of quadrilaterals without overflowing. The edge data written in from FIFO 302 is then stored in edge RAM 304; however, for the case mentioned above where the polygon does not have 2, 3 or 4 vertices or is not Y convex, the edge data from FIFO 302 may pass directly through Trapper 210 to an output.

In accordance with algorithms to be described in more detail below with reference to FIGS. 5 and 6, Trapper 210 is controlled by polygon processor 208 and controller 306 to process the edges of the input polygon stored in edge RAM 304 by determining the slopes of the edges of the input polygon as well as the endpoints of respective edges. As will also be described below, the Y coordinate values (in the direction perpendicular to the scan line) of the endpoints of the edges are sorted by Y-sorter 308, an embodiment of which can be found in related application Ser. No. 07/478,126 filed on Feb. 9 1990 assigned to the same assignee as this application and hereby incorporated herein by reference. The sorted Y data for the resulting trapezoids is then stored in Y-stack 310 for further processing. For example, the Y start value for drawing a particular edge of the output trapezoid will be stored in Y-stack 310 whereby the Y start and Y end values may be used to determine the number of scan lines in the trapezoid.

A command word register 312 also may be provided for providing a command tag bit which determines which words output by Trapper 210 will be interpreted as a command by downstream hardware and an end tag bit which indicates to the downstream hardware that the tagged word is the last one that should be considered as part of a logical block for sequencing purposes. Thus, when Trapper 210 is instructed to draw a trapezoid, the command tag bit will be set while the end tag bit will be cleared. All other data following the command will have both bits cleared. The tag bits as well as the edge data from edge RAM 304 and the Y start and scan line number values from Y-stack 310 then may be combined for output to downstream hardware as a command/data packet by multiplexer 314.

Trapper 210 must receive all necessary data about a polygon before it can start to decompose it into trapezoids. This includes the minimum and maximum Y value for each edge stored in the Y-sorter 308 as well as attributes about each edge stored in edge RAM 304. When this data is received, a Produce Trapezoids command is written to Trapper 210 by polygon processor 208 telling it that all data is present and that it may proceed to make trapezoids. As will be described below, Trapper 210 sorts the Y values of the minimum and maximum Y values for each edge of the input polygon and then compares them sequentially to determine when the end of an edge of the trapezoid has been found. Trapper 210 does so and outputs the trapezoid data, and while Trapper 210 is busy making trapezoids its input FIFO 302 can be written with data for the next polygon as previously described. Polygons that are not suitable for Trapper 210 to work on are decomposed in polygon processor 208 and/or transform processor 204, and the resulting data is merely passed through Trapper 210 for combination by multiplexer 314 into command-/data output packets.

The details of the algorithms implemented by the polygon processor 208 to provide the necessary input data and by Trapper 210 to make trapezoids will now be described with reference to FIGS. 4-6.

Figure 4:
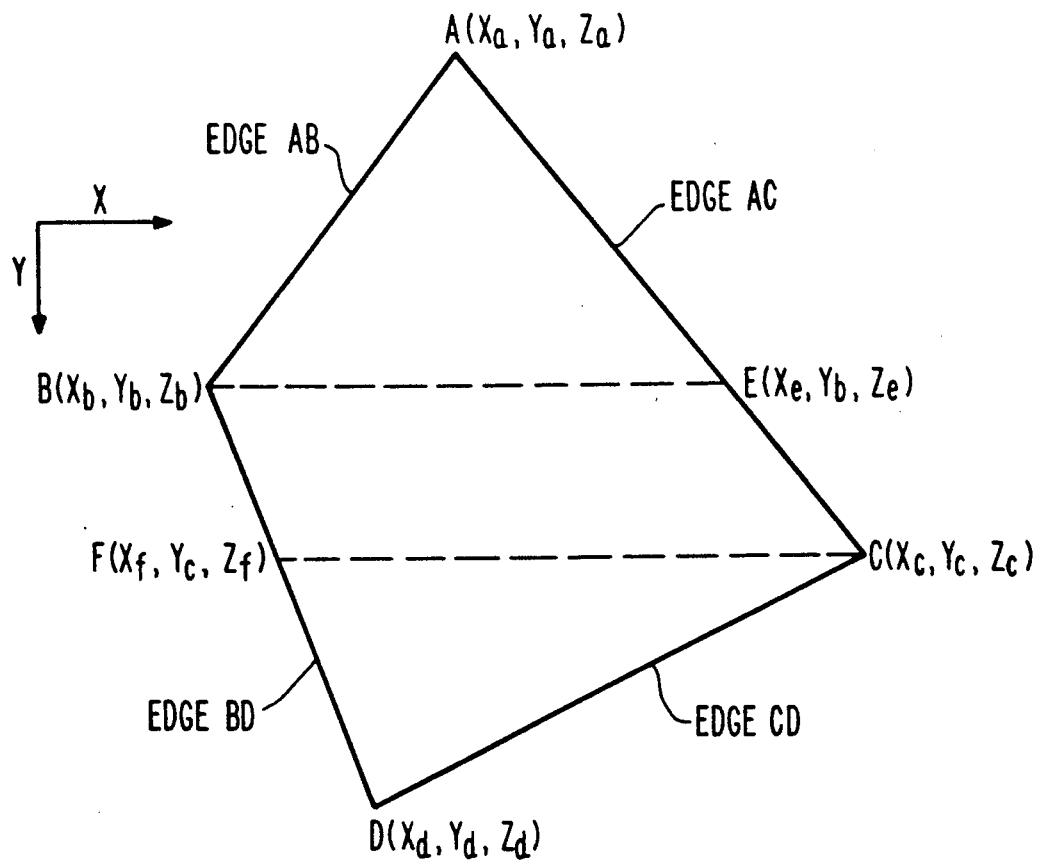
FIG. 4 illustrates an input polygon which is divided into trapezoids in accordance with the invention.

FIG. 4 shows an illustration of a sample input polygon defined by vertices $A(X_a,Y_a,Z_a)$, $B(X_b,Y_b,Z_b)$, $C(X_c,Y_c,Z_c)$ and $D(X_d, Y_d,Z_d)$. As shown in FIG. 4, Trapper 210 respectively subdivides the polygon defined by vertices A, B, C and D into a triangle with vertices A, B and E, a trapezoid with vertices B, E, C and F, and another triangle with vertices C, D and F. The technique by which Trapper 210 performs this trapezoidilization in FIG. 4 will now be described with reference to the flow charts of FIGS. 5 and 6.

As noted above, the edge data describing a particular input polygon is output from polygon processor 208 into FIFO 302, and the data is stored in edge RAM 304. As used in FIGS. 5 and 6, it will be assumed that the vertex data received by the polygon processor 208 comprises an array of respective vertices (3 or 4 in number) which will be defined by the variable "vertex count". The array of vertices are referred to in FIGS. 5 and 6 as Vertex[I], where I is an index into the array such that access to the Nth element in the array is denoted as Vertex[N] and where the first element in the array has an index I=1 which is incremented for reading the vertices from the vertices array. In addition, each vertex in the vertex array is identified by its X, Y and Z coordinates, where access to the X coordinate field of the second vertex in the vertex array is denoted by way of example as Vertex[2].X. Also, in the algorithm of FIG. 5, a pair of variables are defined as Vertex1 and Vertex2. Each of these vertex variables can take on the value of a vertex cell in the vertex array and can be used to access vertex fields like Vertex1.X or Vertex1.Y.

The operation by which the endpoints of the edges of an input polygon are determined by polygon processor 208 will now be described with respect to FIG. 5. Discussion will be directed to the case of trapezoidilization of the polygon shown in FIG. 4, although one skilled in the art will appreciate that the process may be readily applied to any other input polygons meeting the criteria set forth above.

Initially, an array of vertices of the input polygon is read from FIFO 206 into polygon processor 208. For example, for the case of the polygon shown in FIG. 4, the vertices may be read in the sequence A, B, D and C, whereby adjacent vertices define endpoints of the same edge of the polygon. Polygon processor 208 then starts at step 500 and sets the vertex array index I equal to 1 at step 502 to access the first entry in the vertex array (vertex A). I is then compared to the vertex count (4) at step 504. If I is greater than the vertex count, all of the vertices have been read in and the polygon is subdivided at step 506 into trapezoids as described in FIGS. 6 below. The processing then ends at step 508. However, if I is not greater than the vertex count, the variable Vertex1 is set at step 510 to the value of the first element of the vertex array, which for the example given is vertex A. Since the index does not equal the vertex count at step 512, the variable Vertex2 is then assigned at step 514 to the value of the second element in the vertex array, namely, vertex B. On the other hand, if I equals vertex count at step 512, the first vertex in the vertex array (vertex A) is assigned to Vertex2 at step 516. Polygon processor 208 then checks at step 518 whether the Y value of the vertex assigned to variable Vertex1 (vertex A) is greater than the Y value of the vertex assigned to the variable Vertex2 (vertex B). If the Y value of vertex A is greater than that of vertex B, the values of variables Vertex1 and Vertex2 are swapped at step 520. However, since the Y value of vertex B is greater than the Y value of vertex A for the polygon of FIG. 4, processing proceeds directly to step 522 where the variables ytop and ybot are calculated.

Ytop identifies the integer Y value of the first pixel to be drawn for an edge of the input polygon, while ybot corresponds to the integer Y value one greater than the integer Y value of the last pixel to be drawn for an edge, thereby obviating an "off by one" error when the edge is drawn. For the example of FIG. 4, since Vertex1 represents vertex A and Vertex2 represents vertex B, ytop substantially corresponds to $Y_a$, while ybot substantially corresponds to $Y_b$. As shown in FIG. 4, these are the end points of edge AB. Similarly, the variable xtop corresponds to the X value of the first pixel to be drawn for an edge, while the variable ztop corresponds to the Z value of the first pixel to be drawn for an edge. Accordingly, the first pixel to be drawn has coordinates (xtop, ytop, ztop), where ytop is an integer and the other values are not necessarily integers.

After ybot and ytop are determined at step 522, polygon processor 208 then checks at step 524 whether ybot is less than or equal to ytop, and if so, processing proceeds to step 526 where I is incremented and the loop repeated. However, if the Y value of ybot is greater than the Y value of ytop, polygon processor 208 proceeds to step 528 where the value of xtop and xslope are calculated using the data stored in edge RAM 304 as follows:

$$xslope = \frac{Vertex2.X - Vertex1.X}{Vertex2.Y - Vertex1.Y} \text{ and}$$

$$xtop = Vertex1.X + (ytop - Vertex1.Y) * xslope.$$

Similarly, in step 530 ztop and zslope are calculated using the data in edge RAM 304 as follows:

$$zslope = \frac{Vertex2.Z - Vertex1.Z}{Vertex2.Y - Vertex1.Y} \text{ and}$$

$$ztop = Vertex1.Z + (ytop - Vertex1.Y) * zslope.$$

Then, at step 532 the values of these variables are written into edge RAM 304. At step 534 the value of ytop is written to Y-stack 310 and a MIN flag is set to indicate that this value is a ytop, and similarly, at step 536 the value of ybot is written to Y-stack 310 and a MAX flag is set to indicate that this value is a ybot. In other words, the value of ytop is identified as the upper end of edge AB, while the value of ybot is identified as the lower end of edge AB. Processing then proceeds to step 526 where the value of I is incremented and the loop repeated.

Processing proceeds in this manner until all vertices have been read in from the vertex array. It is then determined at step 504 that all vertices have been read in, and polygon processor 208 instructs Trapper 210 to break the input polygon into trapezoids as will be described with respect to FIG. 6. Thus, for the polygon of FIG. 4 having the input vertices array of A, B, D, and C, respectively, Y-stack 310 will contain the following when processing proceeds to step 506:

| Y-value | Flag | Edge |
| --- | --- | --- |
| $Y_a$ | MIN | AB |
| $Y_b$ | MAX | AB |
| $Y_b$ | MIN | BD |
| $Y_d$ | MAX | BD |
| $Y_c$ | MIN | CD |

-continued

| Y-value | Flag | Edge |
| --- | --- | --- |
| $Y_d$ | MAX | CD |
| $Y_a$ | MIN | AC |
| $Y_c$ | MAX | AC |

Once the Y-stack 310 has been created in accordance with the algorithm of FIG. 5 just described, the input polygon is subdivided into trapezoids in accordance with the algorithm shown in FIG. 6, as will now be described.

As noted above, Y-stack 310 contains an array of words with information about the minimum and maximum Y values for each edge in the input polygon. For this purpose, each word in the Y-stack 310 preferably contains a field identifying the integer Y value, a MIN or MAX flag specifying whether the stored value is a MIN or a MAX Y value for an edge, and an edge field representing the edge associated with that entry in the Y-stack 310. In this manner, each value is identified with its corresponding edge. Each word in Y-stack 310 may be accessed via a pointer which will be described herein as ystack pointer. The ystack pointer points to the fields in each word in Y-stack 310 representing the Y integer value, the MIN or MAX flag, or the edge field.

As shown in FIG. 6, Trapper 210 starts at step 600 with the Y-stack values described above and sets flags of edge pointer registers Edge A and Edge B to "EMPTY" at step 602 to indicate that the edge pointers do not point to any edge. As would be apparent to one skilled in the art, these edge pointers may instead have values stored therein indicating that the register does not contain a pointer. The edge pointers are used to keep track in edge RAM 304 of the edges that define the current trapezoid, and as will be described below, are loaded and unloaded with values representing one of the edges in the input polygon as Y-stack 310 is traversed. Also, two "new edge" flags called New Edge A and New Edge B may be used to take on the values of True and False to indicate whether an edge in an edge pointer register is a new edge or an existing edge. These flags are used to take advantage of the fact that some edges are shared and hence need not be read twice when the trapezoids are output. This will become apparent from the following description.

Figure 5:
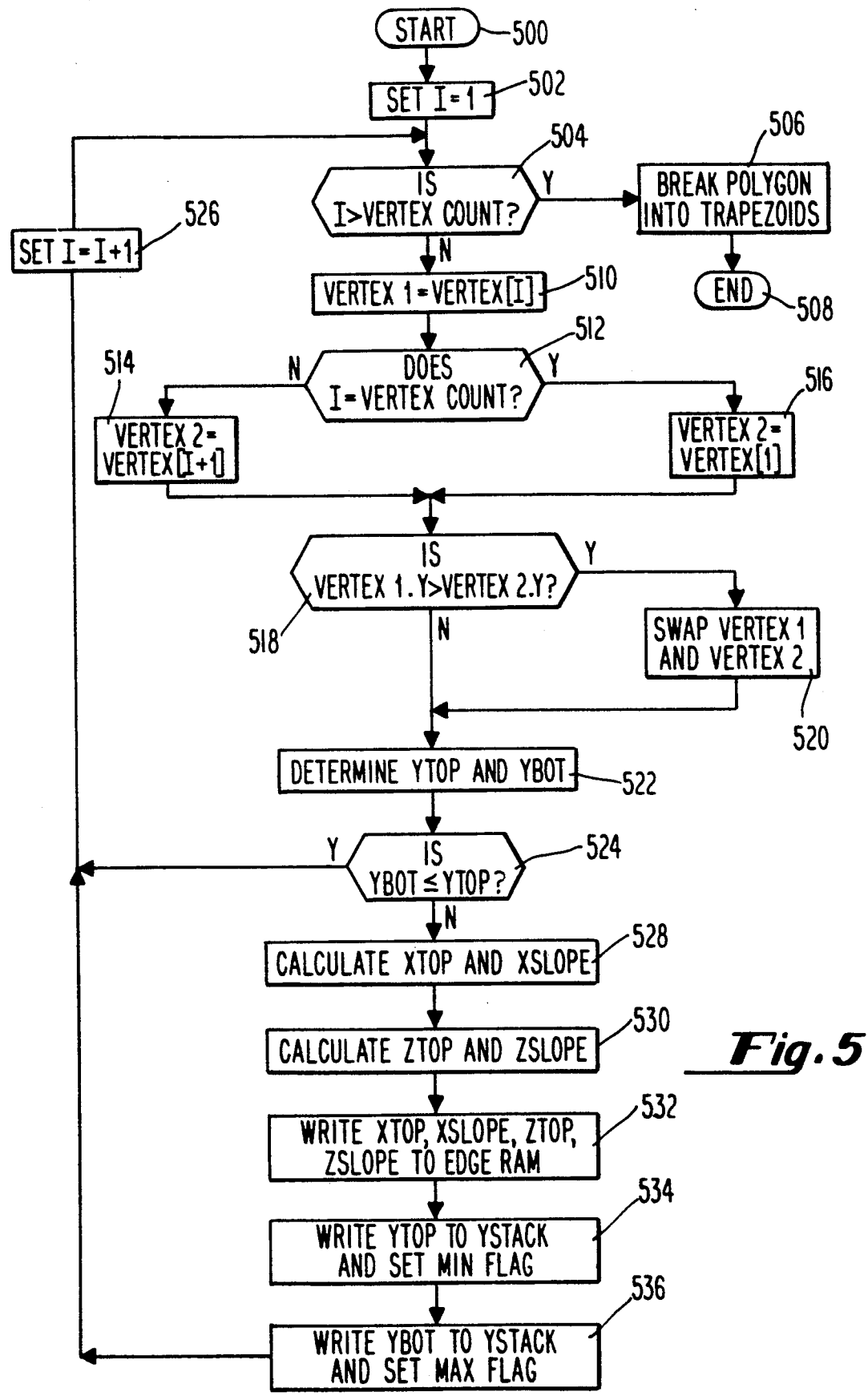
FIG. 5 illustrates an algorithm for determining the endpoints of each segment of an input polygon in accordance with the invention.

After the values of Edge A and Edge B are set to EMPTY at step 602, the values stored in Y-stack 310 during the processing described with respect to FIG. 5 are then sorted in step 604. As described above, this process is performed by Y-sorter 308, which may include a fast sorting device of the type described in the aforementioned related application. In particular, Y-stack 310 is sorted from the minimum value of Y to the maximum value of Y in ascending order of the value fields of the words in Y-stack 310. If two or more entries have the same value field, the entries with flags equal to MAX will come before the entries with flags set to MIN since it is necessary that the data indicate the end of one edge before the beginning of the next edge.

For example, for the two adjacent edges AB and BD of the polygon shown in FIG. 4, $Y_d > Y_b > Y_a$. Each edge will have two entries in the Y-stack, one with a MIN flag and one with a MAX flag. In addition, the MAX entry for edge AB must have a value field equal to the value field for the MIN entry for Edge BD. Moreover, there should never be a pair of entries for an edge such that the MIN entry has a value in its value field greater than or equal to the value in the value field for the MAX entry. Thus, once the Y-stack 310 of the input polygon shown in FIG. 4 is sorted at step 604 by Y-sorter 308, Y-stack 310 includes the following in the order indicated:

| Y-value | Flag | Edge |
|---------|------|------|
| $Y_a$ | MIN | AB |
| $Y_a$ | MIN | AC |
| $Y_b$ | MAX | AB |
| $Y_b$ | MIN | BD |
| $Y_c$ | MAX | AC |
| $Y_c$ | MIN | CD |
| $Y_d$ | MAX | BD |
| $Y_d$ | MAX | CD |

Once the Y-stack 310 is sorted at step 604, the Y-stack pointer is assigned to the first Y-stack entry at step 606, and the entry in the Y-stack pointer value field is assigned as a Y start value for the first output trapezoid at step 608. Trapper 210 then checks at step 610 whether the MIN flag is set for the word pointed to by the Y-stack pointer, and since this is the case for the first entry in the sorted Y-stack 310 shown above, the processing proceeds to step 612, since where it is determined whether edge register Edge A is EMPTY.

this is the case for the first pass through the flow chart of FIG. 6, at step 618 the edge AB in the edge field of the first entry in the Y- stack is read into edge register Edge A, New Edge A is set True, and processing proceeds to step 632. However, if edge register Edge A already had an edge value stored therein, as during the next iteration of the loop, processing would proceed from step 612 to step 614, where it would be determined if edge register Edge B is EMPTY. If neither edge register is empty, an error signal would be generated at step 616. However, if edge register Edge B were empty, at step 620 the value of the input edge would be stored in edge register Edge B, New Edge B would be set to True, and processing would proceed to step 632.

Trapper then checks at step 632 whether the Y-stack pointer is at the last entry in Y-stack 310, and if so, processing ends at step 634. If this is not the case, the Y-stack pointer is incremented to the next Y-stack entry at step 636. Trapper then checks at step 638 whether the value of Y start, which was set in step 608, is equal to the value in the value field pointed to by the incremented Y-stack pointer value. Since both are equal to $Y_a$ for the example given, the processing proceeds back to step 608 for the reading in of edge AC into edge register Edge B at step 620.

However, if at step 638 it is determined that the Y start value does not correspond to the current incremented Y-stack pointer value, Trapper 210 need not read in another edge, and processing then proceeds to step 640, where Trapper 210 checks whether either edge register Edge A or edge register Edge B is empty. If one or both of the edge registers are empty, an error signal is indicated at step 642. When both edges are present in the respective edge registers, a Draw Trapezoid command is produced at step 644 for the region ABE shown in FIG. 4 using the Y start value $Y_a$. The New Edge A and New Edge B flags are then set to False at step 646 before processing returns to step 608 for reading in the next Y start value for the next trapezoid.

During the next iteration of the loop, since the last ystack pointer flag was a MAX flag, at step 610 processing proceeds to step 622 where it is determined if the Y-stack pointer edge field includes the same edge as that stored in edge register Edge A. Since edge register Edge A and the third entry in the Y-stack 310 both include edge AB, edge register Edge A is set to EMPTY at step 628. In other words, since for the polygon of FIG. 4 vertex B is reached before vertex C, edge register Edge A is set to EMPTY so that the next edge may be read into edge register Edge A. Similarly, edge register Edge B would be set to EMPTY at step 630 if it were determined at step 624 that the next edge is the same as that in edge register Edge B. However, if the next edge does not correspond to that in either edge register, an error signal is produced at step 626.

The next edge to be read in will be edge BD, which has a minimum Y value at $Y_b$ and a maximum Y value at $Y_d$. It is stored in the empty edge register (Edge A). Processing proceeds in this manner until Trapper 210 determines at step 632 that all entries in Y-stack 310 have been processed so that processing may end at step 634.

As noted above, a Draw Trapezoid command is produced in step 644 and output with the edge values in edge registers Edge A and Edge B, the Y start value and the number of scan lines to the end of the trapezoid. In particular, the Draw Trapezoid command may be formed by outputting an instruction that a trapezoid follows and then following this instruction with data including the starting trapezoid Y value, the number of scan lines of the trapezoid starting from the starting trapezoid Y value, the starting X value, the rate of change of X for each step in Y, the starting Z value, and the rate of change of Z for each step in Y. This data is then output for the other edge of the trapezoid by reading the appropriate values from Edge RAM 304 or Y-stack 310 as appropriate. The Draw Trapezoid command is then sent downstream to the rendering circuitry so that each polygon of the input image may be appropriately rendered.

The Draw Trapezoid command generated by Trapper 210 may include several fields for indicating the number of previously specified vertices which contain the data corresponding to the appropriate trapezoid vertices. Thus, the vertex fields do not have to point to four different vertices, for two or more could correspond to the same vertex. An example of this would occur when the length of the top edge of the trapezoid is 0, i.e., a triangle is to be rendered, as for triangle ABE shown in FIG. 4. In addition, since two consecutively rendered trapezoids of an input polygon will often share an edge, there is no need to retransmit the slope information for the common edge when the trapezoid is to be displayed. Instead, bits in the transmitted data should indicate that the trapezoid will share an edge with one or more previous trapezoids. For example, the flags New Edge A and New Edge B may be used for this purpose.

The trapezoidilization unit of the invention as described herein provides for a significant performance enhancement over conventional transformation engines in that it can process input polygons in a much more efficient manner. Overall system performance may be improved as much as 50% due to the decomposition technique of the invention, for the scan conversion system may be much faster and simpler than one which must operate on entire polygons. In addition, this performance enhancement is achieved at a relatively low cost. Moreover, since most polygon databases contain primarily triangles and quadrilaterals, the invention will normally decompose most polygons in the system.

Although a single exemplary embodiment of the invention has been described in detail above, those skilled in the art will readily appreciate that many additional modifications are possible in the exemplary embodiment without materially departing from the novel teachings and advantages of the invention. For example, the order in which the vertices of an input polygon are read in may be varied and the software correspondingly changed. In addition, one skilled in the art will realize that rather than using Y values in the algorithm of FIG. 5 that the trapezoids may be composed so as to be parallel with the Y axis instead of the X axis using the same algorithm. This would only require that all of the "X" values become "Y" values and the "Y" values become "X" values. In such a case, Trapper would have an "X" stack and it would be necessary to find "xtop" and "xbot" integer values and so forth. Moreover, other data associated with each vertex, such as perspective data W, may be accommodated in the present system by properly instructing the edge RAM 304 to read in the extra bits corresponding to the W data. Furthermore, the separate control circuitry described for the polygon processor 208 and Trapper 210 may be combined into a single processing unit so that Trapper 210 may operate in conjunction with the polygon processor. Accordingly, all such modifications are intended to be included within the scope of this invention as defined in the following claims.

What is claimed:

1. A device for processing a plurality of polygons representative of an image to be displayed on a display device, each polygon having no more than a predetermined number of edges with associated edge data, comprising:
    means for providing said edge data for each input polygon of said image to be displayed;
    trapezoidilization means for breaking each input polygon having no more than said predetermined number of edges into at least one trapezoid, each trapezoid being a closed quadrilateral having three or four edges of which no more than two edges are not parallel to a coordinate direction of said display device, said trapezoidilization means comprising a RAM for storing said edge data for each input polygon, processing means for determining end points of each edge of each input polygon, means for ordering said end points in accordance with coordinate values of each end point in a direction perpendicular to said coordinate direction of said display device, and a stack register for storing said ordered end points of said edges of each input polygon and for storing a flag representing which end of an edge each end point represents in said direction perpendicular to said coordinate direction; and
    means for outputting the edge data for each trapezoid of each input polygon to said display device.

2. A device as in claim 1 wherein said providing means comprises a transform processor.

3. A device as in claim 1, wherein said providing means processes those input polygons having more than said predetermined number of edges.

4. A device as in claim 1, wherein said providing means provides each vertex of each input polygon to said processing means in a sequence of vertices such that adjacent vertices in the sequence of vertices define respective edges of each input polygon.

5. A device as in claim 4, wherein said processing means determines the coordinate value in the direction perpendicular to said coordinate direction of each end point of each respective edge of each input polygon and stores these values for each edge in said stack register.

6. A device as in claim 5, wherein each trapezoid of an input polygon is defined in said direction perpendicular to said coordinate direction from a starting end point of an edge of said input polygon, a flag of said starting end point indicating that said starting end point has a minimum coordinate value in the direction perpendicular to said coordinate direction for said edge, to a first encountered end point of an edge of said input polygon in the direction perpendicular to said coordinate direction, a flag of said first encountered end point indicating that said first encountered end point has a maximum coordinate value for an edge of the input polygon in the direction perpendicular to said coordinate direction, and is defined in a direction parallel to said coordinate direction from a first edge to a second edge of said input polygon, whereby edges of each trapezoid which are parallel to said coordinate direction respectively pass through the starting end point and the first encountered end point.

7. A device as in claim 6, wherein said starting end point and first encountered end point are taken from said ordered stack register as respective entries having different coordinate values in the direction perpendicular to the coordinate direction.

8. A method of processing a plurality of polygons representative of an image to be displayed on a display device, each polygon having no more than a predetermined number of edges with associated edge data, comprising the steps of:
    providing said edge data for each input polygon of said image to be displayed;
    breaking each input polygon having no more than said predetermined number of edges into at least one trapezoid, each trapezoid being a closed quadrilateral having three or four edges of which no more than two edges are not parallel to a coordinate direction of said display device, said polygon breaking step comprising the steps of storing said edge data for each input polygon, determining end points of each edge of each input polygon, ordering said end points in accordance with coordinate values of each end point in a direction perpendicular to said coordinate direction of said display device, storing said ordered end points of said edges of each input polygon, and storing a flag representing which end of an edge each end point represents in said direction perpendicular to said coordinate direction; and
    outputting the edge data for each trapezoid of each input polygon to said display device.

9. A method as in claim 8 wherein each vertex of each input polygon is provided to said processing means during said providing step in a sequence of vertices such that adjacent vertices in the sequence of vertices define respective edges of each input polygon.

10. A method as in claim 9, wherein said polygon breaking step includes the steps of determining the coordinate value in the direction perpendicular to said coordinate direction of each end point of each respective edge of each input polygon and storing these values for each edge.

11. A method as in claim 10, comprising the further step of rendering each polygon, wherein each trapezoid of a rendered polygon is defined in said direction perpendicular to said coordinate direction from a starting end point of an edge of said input polygon, a flag of said starting end point indicating that said starting end point has a minimum coordinate value in the direction perpendicular to said coordinate direction for said edge, to a first encountered end point of an edge of said input polygon in the direction perpendicular to said coordinate direction, a flag of said first encountered end point indicating that said first encountered end point has a maximum coordinate value for an edge of the input polygon in the direction perpendicular to said coordinate direction, and is defined in a direction parallel to said coordinate direction from a first edge to a second edge of said input polygon, whereby edges of each trapezoid which are parallel to the coordinate direction respectively pass through the starting end point and the first encountered end point.

12. A method as in claim 11, comprising the further steps of outputting a draw trapezoid command and indicating which of the data ouput corresponds to said draw trapezoid command.

13. A method as in claim 12, comprising the further step of outputting for use in said rendering step said draw trapezoid command, said starting end point, a difference in said direction perpendicular to said coordinate direction between coordinate values of said starting end point and said first encountered end point, and edge data identifying edges of said input polygon which are not parallel to said coordinate direction.

14. A device for processing a plurality of polygons representative of an image to be displayed on a display device, each polygon having no more than a predetermined number of edges with associated edge data, comprising:

means for providing said edge data for each input polygon of said image to be displayed;

trapezoidilization means for breaking each input polygon having no more than said predetermined number of edges into at least one trapezoid, each trapezoid being a closed quadrilateral having three or four edges of which no more than two edges are not parallel to a coordinate direction of said display device; and means for outputting the edge data and a draw trapezoid command for each trapezoid of each input polygon to said display device, said outputting means comprising a command word register for indicating which of the date output by said outputting means corresponds to said draw trapezoid command.

* * * * *